United States Patent
No et al.

(10) Patent No.: US 12,192,320 B2
(45) Date of Patent: Jan. 7, 2025

(54) ENCRYPTION METHOD AND APPARATUS USING HOMOMORPHIC ENCRYPTION

(71) Applicants: Samsung Electronics Co., Ltd, Suwon-si (KR); SNU R&DB FOUNDATION, Seoul (KR); Industry-Academic Cooperation Foundation, Chosun University, Gwangju (KR)

(72) Inventors: Jong-Seon No, Seoul (KR); Joonwoo Lee, Seoul (KR); Young-Sik Kim, Gwangju (KR); Yongwoo Lee, Seoul (KR); Eunsang Lee, Seoul (KR)

(73) Assignees: Samsung Electronics Co., Ltd., Suwon-si (KR); SNU R&DB Foundation, Seoul (KR); Industry-Academic Cooperation Foundation, Chosun University, Gwangju (KR)

( * ) Notice: Subject to any disclaimer, the term of this patent is extended or adjusted under 35 U.S.C. 154(b) by 210 days.

(21) Appl. No.: 17/218,790

(22) Filed: Mar. 31, 2021

(65) Prior Publication Data
US 2021/0351913 A1    Nov. 11, 2021

Related U.S. Application Data

(60) Provisional application No. 63/021,761, filed on May 8, 2020.

(30) Foreign Application Priority Data

Oct. 26, 2020    (KR) .................. 10-2020-0139444

(51) Int. Cl.
*H04L 9/00*    (2022.01)

(52) U.S. Cl.
CPC .......... *H04L 9/008* (2013.01); *H04L 2209/12* (2013.01)

(58) Field of Classification Search
CPC .... H04L 9/008; H04L 2209/12; G06F 21/602
See application file for complete search history.

(56) References Cited

U.S. PATENT DOCUMENTS

| | | |
|---|---|---|
| 9,946,970 B2 | 4/2018 | Gilad-Bachrach et al. |
| 10,644,877 B2 | 5/2020 | Khedr et al. |

(Continued)

FOREIGN PATENT DOCUMENTS

| | | |
|---|---|---|
| EP | 2 237 474 A1 | 10/2010 |
| KR | 10-1600016 B1 | 3/2016 |

(Continued)

OTHER PUBLICATIONS

Chen et al. Improved Bootstrapping for Approximate Homomorphic Encryption 2019 Published—International Association for Cryptologic Research pp. 34-54 (Year: 2019).*

(Continued)

*Primary Examiner* — Ellen Tran
(74) *Attorney, Agent, or Firm* — NSIP Law

(57) ABSTRACT

Disclosed is an encryption method and apparatus. The encryption method using homomorphic encryption may include generating a ciphertext by encrypting data, and bootstrapping the ciphertext by performing a modular reduction based on a selection of one or more target points for a modulus corresponding to the ciphertext.

21 Claims, 7 Drawing Sheets

(56) References Cited

U.S. PATENT DOCUMENTS

| | | | | |
|---|---|---|---|---|
| 2013/0170640 A1* | 7/2013 | Gentry | ................... | H04L 9/008 380/30 |
| 2013/0216044 A1* | 8/2013 | Gentry | ................... | H04L 9/008 380/277 |
| 2018/0294950 A1* | 10/2018 | Khedr | ...................... | G09C 1/00 |
| 2019/0065974 A1 | 2/2019 | Michigami | | |
| 2019/0334694 A1* | 10/2019 | Chen | ...................... | H04L 9/008 |

FOREIGN PATENT DOCUMENTS

| | | | |
|---|---|---|---|
| KR | 10-1608515 | B1 | 4/2016 |
| KR | 10-1618941 | B1 | 5/2016 |
| KR | 10-1861089 | B1 | 5/2018 |
| KR | 10-1919940 | B1 | 11/2018 |
| KR | 10-1965628 | B1 | 4/2019 |
| KR | 10-1971215 | B1 | 4/2019 |
| KR | 10-2019159 | B1 | 9/2019 |
| KR | 10-2040106 | B1 | 11/2019 |
| KR | 10-2040120 | B1 | 11/2019 |
| KR | 10-2020-0047002 | A | 5/2020 |

OTHER PUBLICATIONS

Denman, Harry H. "Minimax Polynomial Approximation." *Mathematics of Computation* May 1, 1966, vol. 20, No. 94 pp. 257-265 (9 pages in English).

Cheon, et al. "Privacy-Preserving Computations of Predictive Medical Models with Minimax Approximation and Non-Adjacent Form." *International Conference on Financial Cryptography and Data Security*. Springer, Cham, Nov. 19, 2017, pp. 53-74 (22 pages in English).

Cheon, et al. "Efficient Homomorphic Comparison Methods with Optimal Complexity." *International Conference on the Theory and Application of Cryptology and Information Security*. Springer, Cham, Oct. 21, 2019. (26 pages in English).

Lee, et al. "Near-optimal Polynomial for Modulus Reduction Using L2-norm for Approximate Homomorphic Encryption." *IACR, International Association for Cryptologic Research, IEEE Access* Apr. 27, 2020, vol. 20200428:121602 27 (9 pages in English).

Extended European Search report issued on Aug. 30, 2021 in counterpart European Patent Application No. 21171810.1 (9 pages in English).

Cheon, Jung Hee, et al. "Homomorphic encryption for arithmetic of approximate numbers." *International Conference on the Theory and Application of Cryptology and Information Security*. Springer, Cham, 2017. (23 pages in English).

Cheon, Jung Hee, et al. "Bootstrapping for approximate homomorphic encryption." *Annual International Conference on the Theory and Applications of Cryptographic Techniques*. Springer, Cham, 2018. (21 pages in English).

Chen, Hao, et al. "Improved bootstrapping for approximate homomorphic encryption." *Annual International Conference on the Theory and Applications of Cryptographic Techniques*. Springer, Cham, 2019. (21 pages in English).

Han, Kyoohyung, et al. "Better bootstrapping for approximate homomorphic encryption." *Cryptographers' Track at the RSA Conference*. Springer, Cham, 2020. (26 pages in English).

Gentry, Craig. "Fully Homomorphic Encryption Using Ideal Lattices." Proceedings of the forty-first annual ACM symposium on Theory of computing. 2009.

\* cited by examiner

```
Algorithm 1
    Input  : An input domain [a, b], a continuous function f on [a, b], an
             approximation parameter δ, and generalized polynomial basis
             {g₁, ⋯ , gₙ}.
    Output: The minimax approximate generalized polynomial p for f
 1 Select x₁, x₂, ⋯ , xₙ₊₂ ∈ [a, b] in strictly increasing order.
 2 Find the generalized polynomial p(x) in terms of {g₁, ⋯ , gₙ} with
   p(xᵢ) − f(xᵢ) = (−1)ⁱE for some E.
 3 Divide the interval into n + 1 sections [zᵢ₋₁, zᵢ], i = 1, ⋯ , n + 1, from zeros
   z₁, ⋯ , zₙ of p(x) − f(x), where xᵢ < zᵢ < xᵢ₊₁, and boundary points
   z₀ = a, zₙ₊₁ = b.
 4 Find the maximum (resp. minimum) points for each section when p(xᵢ) − f(xᵢ)
   has positive (resp. negative) value. Denote these extreme points y₁, ⋯ , yₙ₊₁.
 5 ϵₘₐₓ ← maxᵢ |p(yᵢ) − f(yᵢ)|
 6 ϵₘᵢₙ ← minᵢ |p(yᵢ) − f(yᵢ)|
 7 if (ϵₘₐₓ − ϵₘᵢₙ)/ϵₘᵢₙ < δ then
 8 |   return p(x)
 9 else
10 |   Replace xᵢ's with yᵢ's and go to line 2.
11 end
```

FIG. 2A

```
Algorithm 2
    Input  : An input domain D = ⋃ᵢ₌₁ᵗ [aᵢ, bᵢ] ⊂ ℝ, a piecewise continuous
             function f on D, an approximation parameter δ, and a polynomial
             basis {g₁, ⋯ , gₙ}
    Output: The minimax approximate polynomial p for f
 1 Select x₁, x₂, ⋯ , xₙ₊₁ ∈ D in strictly increasing order.
 2 Find the polynomial p(x) with p(xᵢ) − f(xᵢ) = (−1)ⁱE for some E.
 3 Gather all extreme and boundary points such that μ_{p,f}(x)(p(x) − f(x)) ≥ |E|
   into a set B.
 4 Find n + 1 extreme points y₁ < y₂ < ⋯ < yₙ₊₁ with alternating condition
   and maximum absolute sum condition in B.
 5 ϵₘₐₓ ← maxᵢ |p(yᵢ) − f(yᵢ)|
 6 ϵₘᵢₙ ← minᵢ |p(yᵢ) − f(yᵢ)|
 7 if (ϵₘₐₓ − ϵₘᵢₙ)/ϵₘᵢₙ < δ then
 8 |   return p(x)
 9 else
10 |   Replace xᵢ's with yᵢ's and go to line 2.
11 end
```

FIG. 2B

```
Algorithm 3
    Input  : An increasing ordered set of extreme points B = {t_1, t_2, ···, t_m}
             with m ≥ n + 1, and number of basis n.
    Output : n + 1 points in B satisfying alternating condition and maximum
             absolute sum condition.
 1  i ← 1
 2  while t_i is not the last element of B do
 3    |  if μ(t_i)μ(t_{i+1}) = 1 then
 4    |    |  Remove from B one of two points t_i, t_{i+1} having less value among
      |    |    {|r(t_i)|, |r(t_{i+1})|}.
 5    |  else
 6    |    |  i ← i + 1
 7    |  end
 8  end
 9  if |B| > n + 2 then
10    |  Calculate all |r(t_i)| + |r(t_{i+1})| for i = 1, ···, |B| − 1 and sort and store this
      |    values into the array T.
11  while |B| > n + 1 do
12    |  if |B| = n + 2 then
13    |    |  Remove from B one of two points t_1, t_{|B|} having less value among
      |    |    {|r(t_1)|, |r(t_{|B|})|}.
14    |  else if |B| = n + 3 then
15    |    |  Insert |r(t_1)| + |r(t_{|B|})| into T and sort T. Remove from B the two
      |    |    element having the smallest value in T.
16    |  else
17    |    |  if t_1 or t_{|B|} is included in the smallest element in T then
18    |    |    |  Remove from B only t_1 or t_{|B|}.
19    |    |  else
20    |    |    |  Remove from B the two elements having the smallest element in T.
21    |    |  end
22    |    |  Remove from T all elements related to the removed extreme points,
      |    |    and insert into T the sum of absolute error values of the two newly
      |    |    adjacent extreme points.
23    |  end
24  end
```

FIG. 4A

ENCRYPTION METHOD AND APPARATUS USING HOMOMORPHIC ENCRYPTION

CROSS-REFERENCE TO RELATED APPLICATIONS

This application claims the benefit under 35 USC 119(e) of U.S. Provisional Application No. 63/021,761 filed on May 8, 2020, and the benefit under 35 USC 119(a) of Korean Patent Application No. 10-2020-0139444 filed on Oct. 26, 2020, in the Korean Intellectual Property Office, the entire disclosures of which are incorporated herein by reference for all purposes.

BACKGROUND

1. Field

The following description relates to an encryption method and apparatus using homomorphic encryption.

2. Description of Related Art

Fully homomorphic encryption is an encryption scheme that enables an arbitrary logical operation or a mathematical operation to be performed on encrypted data. A fully homomorphic encryption method maintains security in data processing.

However, in the conventional encryption method, it is difficult to process encrypted data and thus, inadequate for protecting customer privacy.

Fully homomorphic encryption enables customers to receive many services while preserving privacy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an encryption method using homomorphic encryption includes generating a ciphertext by encrypting data, and bootstrapping the ciphertext by performing a modular reduction based on a selection of one or more target points for a modulus corresponding to the ciphertext.

The bootstrapping may include bootstrapping the ciphertext by approximating a function corresponding to the modular reduction.

The bootstrapping of the ciphertext by approximating the function corresponding to the modular reduction may include generating a target approximate polynomial that approximates the function corresponding to the modular reduction.

The generating of the target approximate polynomial may include determining one or more reference points based on a degree of the target approximate polynomial, determining an arbitrary polynomial based on the one or more reference points, and generating the target approximate polynomial based on one or more extreme points selected from the arbitrary polynomial.

The determining may include determining a piecewise continuous function that passes through the one or more reference points, and determining the arbitrary polynomial, by generating a polynomial such that absolute values of errors between the polynomial and the piecewise continuous function at the one or more reference points are a predetermined value.

The determining of the arbitrary polynomial by generating the polynomial may include determining the arbitrary polynomial, by generating a polynomial such that an error at a first reference point included in the one or more reference points and an error at a second reference point adjacent to the first reference point are different in sign, and absolute values of the errors are the predetermined value.

The generating of the target approximate polynomial based on the one or more extreme points selected from the arbitrary polynomial may include determining candidate points whose absolute values are greater than or equal to a predetermined value among extreme points of errors between the arbitrary polynomial and a piecewise continuous function that passes through the one or more reference points selecting target points from among the candidate points, where the number of target points is based on the degree of the target approximate polynomial, and generating the target approximate polynomial based on the target points.

The selecting of the target points may include selecting the target points from among the candidate points such that a maximum and a minimum appear in alternation.

The selecting of the target points may include selecting the target points such that the sum of the absolute values of the errors is maximized.

The generating of the target approximate polynomial based on the one or more extreme points selected from the arbitrary polynomial may include generating, as the target approximate polynomial, a polynomial for a case where a relative error between a maximum value and a minimum value among the absolute values of the one or more extreme points is less than a threshold.

A basis of the target approximate polynomial may be the basis of the Chebyshev polynomials.

A non-transitory computer-readable storage medium may store instructions that, when executed by one or more processors, configure the one or more processors to perform the method above.

In another general aspect, an encryption apparatus using homomorphic encryption includes one or more processors configured to generate a ciphertext by encrypting data, and bootstrap the ciphertext by performing a modular reduction based on a selection of one or more target points for a modulus corresponding to the ciphertext.

The user apparatus may further include a memory configured to store instructions. The one or more processors may be further configured to execute the instructions to configure the one or more processors to: generate the ciphertext by encrypting data, and bootstrap the ciphertext by performing the modular reduction based on the selection of the one or more target points for the modulus corresponding to the ciphertext.

The one or more processors may be configured to bootstrap the ciphertext by approximating a function corresponding to the modular reduction.

The one or more processors may be configured to generate a target approximate polynomial that approximates the function corresponding to the modular reduction.

The one or more processors may be configured to determine one or more reference points based on a degree of the target approximate polynomial, determine an arbitrary polynomial based on the one or more reference points, and generate the target approximate polynomial based on one or more extreme points selected from the arbitrary polynomial.

The one or more processors may be configured to determine a piecewise continuous function that passes through the one or more reference points, and determine the arbitrary polynomial, by generating a polynomial such that absolute values of errors between the polynomial and the piecewise continuous function at the one or more reference points are a predetermined value.

The one or more processors may be configured to determine the arbitrary polynomial, by generating a polynomial such that an error at a first reference point included in the one or more reference points and an error at a second reference point adjacent to the first reference point are different in sign, and absolute values of the errors are the predetermined value.

The one or more processors may be configured to determine candidate points whose absolute values are greater than or equal to a predetermined value among extreme points of errors between the arbitrary polynomial and a piecewise continuous function that passes through the one or more reference points, select target points from among the candidate points, where the number of target points is based on the degree of the target approximate polynomial, and generate the target approximate polynomial based on the target points.

The one or more processors may be configured to select the target points from among the candidate points such that a maximum and a minimum appear in alternation.

The one or more processors may be configured to select the target points such that the sum of the absolute values of the errors is maximized.

The one or more processors may be configured to generate, as the target approximate polynomial, a polynomial for a case where a relative error between a maximum value and a minimum value among the absolute values of the one or more extreme points is less than a threshold.

A basis of the target approximate polynomial may be the basis of the Chebyshev polynomials.

In another general aspect, an apparatus configured to perform a fully homomorphic encryption scheme includes one or more processors configured to generate a ciphertext by encrypting data, bootstrap the ciphertext by performing an approximation of a function corresponding to a modular reduction based on a selection of one or more target points for a modulus corresponding to the ciphertext, and generate a target approximate polynomial configured to approximate the function corresponding to the modular reduction.

The target approximate polynomial may be generated using Chebyshev alternation theorem.

The one or more processors may be further configured to determine one or more reference points based on a degree of the target approximate polynomial, determine an arbitrary polynomial based on the one or more reference points, and generate the target approximate polynomial based on one or more extreme points selected from the arbitrary polynomial.

Other features and aspects will be apparent from the following detailed description, the drawings, and the claims.

BRIEF DESCRIPTION OF THE DRAWINGS

FIG. 2A illustrates an example of an algorithm for generating a target approximate polynomial by the encryption apparatus of FIG. 1.

FIG. 2B illustrates an example of an algorithm for generating a target approximate polynomial by the encryption apparatus of FIG. 1.

FIG. 4A illustrates an example of an algorithm for selecting target points by the encryption apparatus of FIG. 1.

Figure 1:
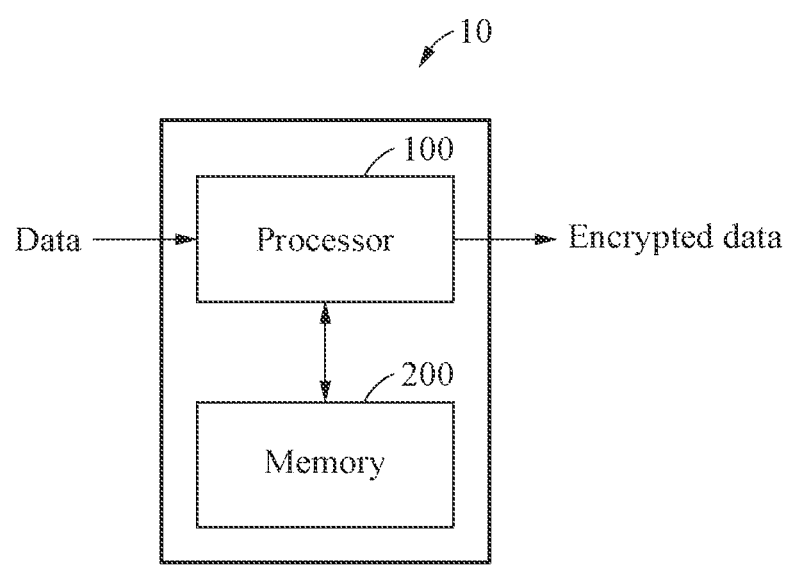
FIG. 1 illustrates an example of an encryption apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of an encryption apparatus.

In FIG. 1, an encryption apparatus 10 may encrypt data. The encryption apparatus 10 may generate encrypted data through encryption of data. Hereinafter, the encrypted data may be referred to as a ciphertext. The use of the term "may" herein with respect to an example or embodiment (for example, as to what an example or embodiment may include or implement) means that at least one example or embodiment exists where such a feature is included or implemented, while all examples are not limited thereto.

The encryption apparatus 10 may provide an encryption technique for performing an operation in a computer and/or server, e.g., by performing calculations on data encrypted using fully homomorphic encryption, without decrypting it first. The result of the operation is in an encrypted form and when the output of the operation is decrypted, the output is the same as if the operations had been performed on an unencrypted data. The encryption apparatus 10 allows for data privacy to be preserved even when data is shared with a $3^{rd}$ party because the data can remain encrypted when the $3^{rd}$ party uses or performs computations on the data.

The encryption apparatus 10 may provide an encryption technique for performing an operation, e.g., calculations, on data encrypted using homomorphic encryption without decrypting it first. In an example, the encryption apparatus 10 may decrypt a result of operating data encrypted using homomorphic encryption, thereby deriving the same result as an operation on data of a plain text. The encryption apparatus 10 may provide homomorphic encryption operations for real or complex numbers.

The encryption apparatus 10 may perform bootstrapping required for homomorphic encryption. The encryption apparatus 10 may generate a target approximate polynomial that approximates a function corresponding to a modular reduction required for homomorphic encryption.

The encryption apparatus 10 may find a minimax approximation error for each degree of an optimal minimax approximate polynomial.

The encryption apparatus 10 may find an optimal approximate polynomial through the target approximate polynomial, thereby providing excellent performance in terms of the minimax approximation error of homomorphic encryption.

The encryption apparatus 10 may generate a target approximate polynomial that approximates the modular reduction function based on approximation region information for approximating the modular reduction function.

The encryption apparatus 10 includes a processor 100 and a memory 200.

The processor 100 may process data stored in the memory. The processor 100 may execute a computer-readable code (for example, software) stored in the memory 200 and instructions triggered by the processor 100.

The "processor 100" may be a data processing device implemented by hardware including a circuit having a physical structure to perform desired operations. For example, the desired operations may include instructions or codes included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 100 may generate a ciphertext by encrypting data. The processor 100 may bootstrap the ciphertext by performing a modular reduction on a modulus corresponding to the generated ciphertext.

The processor 100 may bootstrap the ciphertext by approximating a function corresponding to the modular reduction. The processor 100 may generate a target approximate polynomial that approximates the function corresponding to the modular reduction.

The processor 100 may determine one or more reference points based on a degree of the target approximate polynomial.

The processor 100 may obtain an arbitrary polynomial based on the determined one or more reference points. The processor 100 may obtain a piecewise continuous function that passes through the one or more reference points. The processor 100 may obtain the arbitrary polynomial, by generating a polynomial such that absolute values of errors between the polynomial and the piecewise continuous function at the one or more reference points are a predetermined value.

The processor 100 may obtain the arbitrary polynomial by generating a polynomial, where an error at a first reference point included in the one or more reference points and an error at a second reference point adjacent to the first reference point are different in sign, and absolute values of the errors are the predetermined value.

The processor 100 may generate the target approximate polynomial based on one or more extreme points selected from the arbitrary polynomial. In detail, the processor 100 may obtain candidate points whose absolute values are greater than or equal to a predetermined value among extreme points of errors between the arbitrary polynomial and the piecewise continuous function that passes through the one or more reference points.

The processor 100 may select target points from among the obtained candidate points, where the number of target points is based on the degree of the target approximate polynomial. The processor 100 may select the target points from among the candidate points such that a maximum and a minimum appear in alternation. The processor 100 may select the target points such that the sum of the absolute values of the errors between the arbitrary polynomial and the piecewise continuous function that passes through the one or more reference points is maximized.

The processor 100 may generate the target approximate polynomial based on the selected target points. The processor 100 may generate, as the target approximate polynomial, a polynomial for a case where a relative error between a maximum value and a minimum value among the absolute values of the one or more extreme points is less than a threshold.

In this example, a basis of the target approximate polynomial may be the basis of the Chebyshev polynomials.

The memory 200 may store instructions (or programs) executable by the processor. For example, the instructions may include instructions to perform an operation of the processor and/or an operation of each element of the processor.

The memory 200 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Hereinafter, a process of performing encryption and bootstrapping by the encryption apparatus 10 will be described in further detail with reference to FIGS. 2A to 2C. Specifically, an encryption operation performed by the encryption apparatus 10 will be described, and then a bootstrapping process will be described in more detail.

Figure 2C:
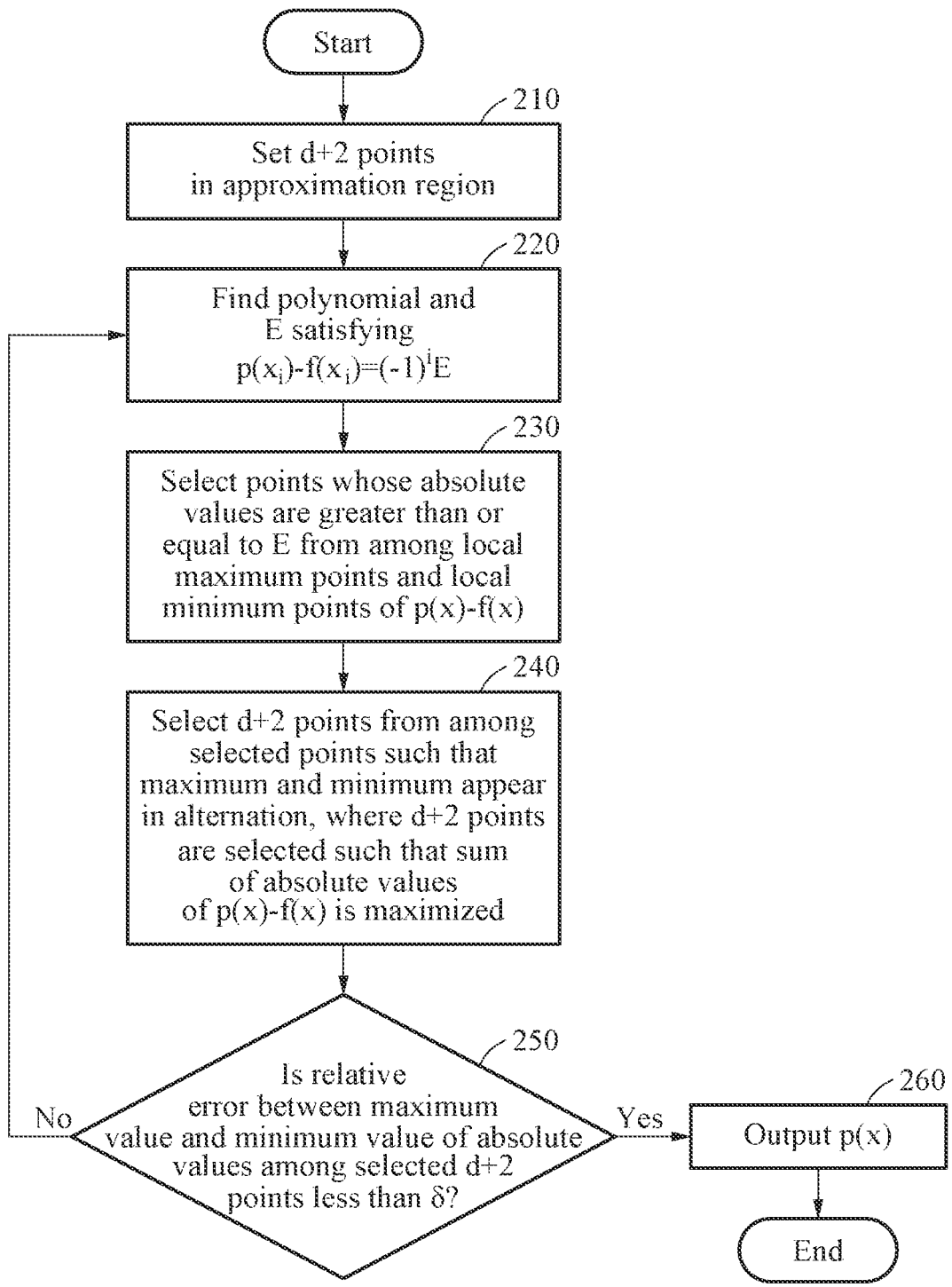
FIG. 2C illustrates an example of generating a target approximate polynomial by the encryption apparatus of FIG. 1.

FIGS. 2A and 2B illustrate examples of algorithms for generating a target approximate polynomial by the encryption apparatus of FIG. 1, and FIG. 2C illustrates an example of generating a target approximate polynomial by the encryption apparatus of FIG. 1.

In FIGS. 2A to 2C, the processor 100 may encrypt data.

Hereinafter, notations for describing the encryption operation of the processor 100 will be described.

$\mathbb{Z}$, $\mathbb{Q}$, $\mathbb{R}$, and $\mathbb{C}$ denote sets of integers, rational numbers, real numbers, and complex numbers, respectively. C[D] denotes a set of continuous functions on a domain D. [d] denotes a set of positive integers less than or equal to d. For example, [d] may be $\{1, 2, \ldots, d\}$.

round(x) denotes a function that outputs the integer nearest to x. For M, which is a power of 2, $\Phi_M(X) = X^N + 1$ denotes an M-th cyclotomic polynomial, where M=2N.

$\mathcal{R}$ and $\mathcal{R}_q$ denote $\mathcal{R} = \mathbb{Z}[X]/\langle \Phi_M(X) \rangle$ and $\mathcal{R}_q = \mathcal{R}/q\mathcal{R}$, respectively. $\mathbb{Q}[X]/\langle \Phi_M(X) \rangle$ denotes an M-th cyclotomic field.

For a positive real number $\alpha$, $\mathcal{DG}(\alpha)$ is defined as the distribution in $\mathbb{Z}^N$ whose entries may be sampled independently from the discrete Gaussian distribution of a variance $\alpha^2$.

$\mathcal{HWT}(h)$ denotes a subset of $\{0,\pm 1\}^N$ with a Hamming weight h. $\mathcal{ZO}(\rho)$ denotes the distribution in $\{0,\pm 1\}^N$ whose entries may be sampled independently with a probability $\rho/2$ for each of $\pm 1$ and a probability being zero, $1-\rho$.

The Chebyshev polynomials $T_n(x)$ are defined by cos $n\theta = T_n(\cos\theta)$. The base of a logarithm described below is 2.

Hereinafter, the encryption operation performed by the processor 100 will be described.

The processor 100 may support several operations for encrypted data of real numbers or complex numbers. Since the encryption apparatus 10 deals with usually real numbers, the noise that ensures the security of the encryption scheme may be embraced in the outside of the significant figures of the data.

Several independent messages may be encoded into one polynomial by the canonical embedding before encryption. The canonical embedding $\sigma$ may embed $\alpha \in \mathbb{Q}[X]/\langle \Phi_M(X) \rangle$ into an element of $\mathbb{C}^N$, and the elements $\mathbb{C}^N$ of may be values of $\alpha$ evaluated at the distinct roots of $\Phi_M(X)$.

The roots of $\Phi_M(X)$ may be the power of odd integers of the M-th root of unity, and $\mathbb{Z}^*_M = \langle -1, 5 \rangle$.

$\mathbb{H}$ may be $\mathbb{H} = \{(z_j)j \in \mathbb{Z}^*_M : z_j = \overline{z_{-j}}\}$, and $\pi$ may be a natural projection from $\mathbb{H}$ to $\mathbb{C}^{N/2}$. The range of $\sigma$ may be $\mathbb{H}$.

When N/2 messages of complex numbers constitute an element in $\mathbb{C}^{N/2}$, each coordinate may be called a slot. The encoding and decoding procedures may be given as below.

For a vector $z \in \mathbb{C}^{N/2}$, encoding Ecd(z; $\Delta$) may return the value of Equation 1.

$$m(X) = \sigma^{-1}(\lfloor \Delta \cdot \pi^{-1}(z) \rceil_{\sigma(\mathcal{R})}) \in \mathcal{R} \qquad \text{[Equation 1]}$$

Here, $\Delta$ is the scaling factor, and $\lfloor \pi^{-1}(z) \rceil_{\sigma(\mathcal{R})}$ denotes discretization or rounding operation of $\pi^{-1}(z)$ into an element of $\sigma(\mathcal{R})$.

For a polynomial $m(X) \in \mathcal{R}$, decoding Dcd(m; $\Delta$) may return a vector $z \in \mathbb{C}^{N/2}$ whose entry of index $j$ satisfies $z_j = \lfloor \Delta^{-1} \cdot m(\zeta_M^{5j}) \rceil$ for $j \in \{0, 1, \ldots, N/2-1\}$, where $\zeta_M$ may be the M-th root of unity.

The encryption apparatus 10 may generate keys. For a given security parameter $\lambda$, the encryption apparatus 10 may select a power of two M, an integer h, an integer P, a real positive number $\alpha$, a fresh ciphertext modulus $q_L$, and a big ciphertext modulus Q, which will be the maximum ciphertext modulus.

A fresh ciphertext may be encrypted data on which no operation is performed or data that is encrypted first.

The processor 100 may set a public key pk and a secret key sk as expressed by Equation 2.

$$sk := (1, s), \ pk := (-as + e, a) \in \mathcal{R}_{q_L}^2 \qquad \text{[Equation 2]}$$

Here, s, a, and e denote $s \leftarrow \mathcal{HWT}(h)$, $a \leftarrow \mathcal{DG}_{q_L}$, and $e \leftarrow \mathcal{DG}(\alpha^2)$, respectively.

The processor 100 may set an evaluation key as expressed by Equation 3.

$$evk := (-a's + e' + Ps^2, a') \in \mathcal{R}_{P \cdot q_L}^2 \qquad \text{[Equation 3]}$$

a' and e' denote $a' \leftarrow \mathcal{R}_{P \cdot q_L}$ and $e' \leftarrow \mathcal{DG}(\alpha^2)$, respectively.

The processor 100 may return the result of Equation 4 by performing encoding $Enc_{pk}(m \in \mathcal{R})$.

$$c = \upsilon \cdot pk + (m + e_0, e_1) \bmod q_L \qquad \text{[Equation 4]}$$

Here, $\upsilon$, and $e_0$ and $e_1$ may be sampled as expressed by $\upsilon \leftarrow \mathcal{ZO}(0, 5)$ and $e_0, e_1 \leftarrow \mathcal{DG}(\alpha^2)$, respectively.

The processor 100 may return $\overline{m} = \langle c, sk \rangle \bmod q_\ell$ by performing decoding $Dec_{sk}(c \in \mathcal{R}_{q_\ell}^2)$.

The processor 100 may return the result of Equation 5 by performing addition Add($c_1$, $c_2 \in \mathcal{R}_{q_l}^2$) on two ciphertexts.

$$c_{add} = c_1 + c_2 \bmod q_l \qquad \text{[Equation 5]}$$

The processor 100 may return the result of Equation 6 by performing multiplication $\text{Mult}_{evk}(c_1, c_2 \in \mathcal{R}_{q_l}^2)$ on the two ciphertexts $c_1 = (b_1, a_1)$ and $c_2 = (b_2, a_2)$.

$$c_{mult} = (d_0, d_1) + \lfloor P^{-1} \cdot d_2 \cdot evk \rceil \bmod q_l \qquad \text{[Equation 6]}$$

Here, $(d_0, d_1, d_2) := (b_1 b_2, a_1 b_2 + a_2 b_1, a_1 a_2) \bmod q_l$.

Further, the processor 100 may return the result of Equation 7 by performing $RS_{l \to l'}(c \in \mathcal{R}_{q_l}^2)$.

$$c' = \left\lfloor \frac{q_{l'}}{q_l} c \right\rceil \bmod q_{l'} \qquad \text{[Equation 7]}$$

Each ciphertext may have a level $\ell$ representing the maximum number of possible multiplications without bootstrapping. The modulus $q_\ell$ for each ciphertext of level $\ell$ may have a value of $p^\ell q_0$, where $p$ is the scaling factor, and $q_0$ is the base modulus.

In addition, the processor 100 may perform rotation and complex conjugation operations which are used for homomorphic linear transformation in bootstrapping.

Hereinafter, the bootstrapping operation performed by the encryption apparatus 10 will be described.

The purpose of bootstrapping may be to refresh a ciphertext of level 0, whose multiplication cannot be performed any further, to a fresh ciphertext of level L having the same messages.

A ciphertext may be encrypted data. The level of ciphertext may be the number of possible multiplications without bootstrapping.

Bootstrapping may include four operations. Firstly, bootstrapping may include a modulus raising operation, and secondly, bootstrapping may include a homomorphic linear transformation operation. Thirdly, bootstrapping may include a homomorphic modular reduction operation, and fourthly, bootstrapping may include a homomorphic linear transformation operation.

The processor 100 may perform a modulus raising operation. To describe the modulus raising operation, a ciphertext of level 0 may be used as an element of $\mathcal{R}_Q^2$, instead $\mathcal{R}_{q_0}^2$.

The ciphertext of level 0 may be in a state of $\langle ct, sk \rangle \approx m \bmod q_0$. Here, ct denotes a ciphertext, and sk denotes a secret key. When the processor 100 tries to decrypt the ciphertext, the ciphertext may have the form of $\langle ct, sk \rangle \approx m + q_0 I \bmod Q$ for some $I \in \mathcal{R}$.

Here, coefficients of sk include small numbers, and thus the absolute values of coefficients of I may be small. For example, the absolute values of coefficients of I may be smaller than 12.

The processor 100 may generate ct' that satisfies $\langle ct', sk \rangle \approx m \bmod q_L$ by bootstrapping the ciphertext of level 0. To this end, the processor 100 may perform homomorphic linear transformation and homomorphic evaluation of the modular reduction function.

Hereinafter, the homomorphic linear transformation performed by the processor 100 will be described. The ciphertext ct after modulus raising may be considered as a ciphertext encrypting $m + q_0 I$. The processor 100 may perform a modular reduction to coefficients of message polynomial homomorphically.

The operations are all for slots, not for coefficients of the message polynomial. Thus, to perform meaningful operations on coefficients, the processor 100 may convert ct into a ciphertext that encrypts coefficients of $m + q_0 I$ as its slots.

After evaluating the homomorphic modular reduction function, the processor 100 may reversely convert this ciphertext into the other ciphertext ct' that encrypts the slots of the previous ciphertext as the coefficients of its message. Hereinafter, these conversion and reverse conversion operations are called CoeffToSlot and SlotToCeff, respectively.

The two conversion operations described above may be regarded as homomorphic evaluation of encoding and decoding of messages, which may be a linear transformation by some variants of a Vandermonde matrix for roots of $\Phi_M(x)$. Further, the conversion operations may be performed by general homomorphic matrix multiplication or FFT-like operation.

The processor 100 may perform the homomorphic modular reduction (or modular reduction) operation. In detail, the processor 100 may perform the modular reduction operation using the homomorphic modular reduction function.

After CoeffToSlot conversion is performed, the processor 100 may perform a modular reduction homomorphically on each slot in modulus $q_0$. Hereinafter, this procedure may be called EvalMod.

By restricting the range of the messages such that $m/q^0$ is small enough, the processor 100 may restricts the approximation region near multiples of $q_0$. Through this range restriction, the processor 100 may perform the modular reduction more effectively.

Hereinafter, the algorithm of FIG. 2A will be described in detail.

The processor 100 may generate a target approximate polynomial by finding a minimax approximate polynomial for any continuous function on an interval [a, b] using Algorithm 1 of FIG. 2A. The processor 100 may use Chebyshev alternation theorem to generate a target approximate polynomial satisfying equioscillation condition.

The processor 100 may generate a target approximate polynomial whose basis function $\{g_1, \ldots, g_n\}$ satisfies the Haar condition. To generate a target approximate polynomial of degree d, the processor 100 may select the basis function $\{g_1, \ldots, g_n\}$ by the power basis $\{1, x, \ldots, x^d\}$. Here, n=d+1.

The processor 100 may initialize the set of reference points that are converged to the extreme points of the minimax approximate polynomial. The processor 100 may obtain the minimax approximate polynomial in regard to the set of reference points. Since the set of reference points is the set of finite points in [a, b], it may be a closed subset of [a, b], and thus Chebyshev alternation theorem may be satisfied for the set of reference points.

When f(x) is a continuous function on [a, b], the minimax approximate polynomial on the set of reference points may be a generalized polynomial p(x) with the basis $\{g_1, \ldots, g_n\}$ satisfying the condition of Equation 8 for some E.

$$p(x_i) - f(x_i) = (-1)^i E \quad i = 1, \ldots, d+2 \qquad \text{[Equation 8]}$$

The processor 100 may obtain an arbitrary polynomial p(x) using Equation 8. According to Equation 8, a system of linear equations having n+1 equations and n+1 variables of n coefficients of p(x) and E, and the linear equations are not singular by the Haar condition, and thus the processor 100 may obtain the polynomial p(x) satisfying the condition of Equation 8.

The processor 100 may obtain n zeros of $z_i$ of p(x)−f(x) between and $x_i$ and $x_{i+1}$ if $z_0 = a$, $z_{n+1} = b$, and i=1, 2, …, n, and may obtain n+1 extreme points $y_1, \ldots, y_{n+1}$ of p(x)−f(x) in each $[z_{i-1}, z_i]$.

The processor 100 may select the minimum point of p(x)=f(x) in $[z_{i-1}, z_i]$ if $p(x_i)-f(x_i)<0$, and select the maximum point of p(x)-f(x) in $[z_{i-1}, z_i]$ if $p(x_i)-f(x_i)>0$.

Through this, the processor 100 may select a new set of extreme points $\hat{y}_1, \ldots, \hat{y}_{n+1}$ as candidate points. If these candidate points satisfy equioscillation condition, the processor 100 may generate a target approximate polynomial by returning a minimax approximate polynomial from the Chebyshev alternation theorem.

Further, the processor 100 may replace a set of reference points with the new set of extreme points $\hat{y}_1, \ldots, \hat{y}_{n+1}$ obtained through the above process, and iteratively perform the polynomial generating process described above.

Algorithm 1 shown in FIG. 2A may be extended to the multiple sub-intervals of an interval. When Algorithm 1 extended to the multiple sub-intervals is applied, steps 3 and 4 of FIG. 2A may be changed.

For each iteration, the processor 100 may obtain all local extreme points of an error function p−f whose absolute error values may be larger than the absolute error values at the current reference points.

Then, the processor 100 may select, from among all of the obtained local extreme points, n+1 new extreme points satisfying the following two criteria:
1. The error values alternate in sign.
2. A new set of extreme points includes the global extreme point.

The above two criteria may ensure the convergence to the minimax generalized polynomial.

FIGS. 2B and 2C show a polynomial generating method modified from the algorithm of FIG. 2A. The processor 100 may modify the method of selecting new extreme points from among all local extreme points.

The algorithm of FIG. 2B may be illustrated as the flowchart of FIG. 2C. In operation 210, the processor 100 may set d+2 points in an approximation region. The d+2 points may be the one or more reference points described above.

The processor 100 may obtain an arbitrary polynomial based on the d+2 reference points. For example, in operation 220, the processor 100 may find a polynomial p(x) and the value of E satisfying Equation 8.

In operation 230, the processor 100 may obtain points whose absolute values are greater than or equal to E among local maximum points and local minimum points of p(x)−f(x). Here, the value of E may be the predetermined value described above, and the obtained local maximum point and local minimum point may be the candidate points described above.

In operation 240, the processor 100 may select d+2 points from among the obtained points such that the maximum and the minimum appear in alternation, where the d+2 points may be selected such that the sum of absolute values of p(x)=f(x) is maximized. The d+2 points at which the sum of absolute values is maximized may be the target points described above. The process of selecting d+2 points such that the sum of absolute values is maximized will be described in detail with reference to FIGS. 4A and 4B.

In operation 250, the processor 100 may determine whether the relative error between the maximum value and the minimum value of the absolute values among the selected d+2 target points is less than δ, δ may be the threshold described above.

In operation 260, the processor 100 may output an arbitrary polynomial p(x) as a target approximate polynomial if the relative error between the maximum value and the minimum value of the absolute values corresponding to the target points is less than δ. Otherwise, the processor 100 may iteratively perform the process of operations 220 to 250.

Hereinafter, the operations of FIGS. 2B and 2C will be described in more detail.

The function to be approximated by the processor 100 may be a normalized modular reduction function defined in only near finitely many integers as expressed by Equation 9.

$$normod(x) = x - \text{round}(x), \quad \text{[Equation 9]}$$

$$x \in \bigcup_{i=-(K-1)}^{K-1} [i-\epsilon, i+\epsilon]$$

Equation 9 may express the modular reduction function scaled for both its domain and range.

The processor 100 may use the cosine function to approximate normod(x) to use double-angle formula for efficient homomorphic evaluation.

If the double-angle formula is used $\ell$ times, the cosine function in Equation 10 may need to be approximated.

$$\cos\left(\frac{2\pi}{2^\ell}\left(x - \frac{1}{4}\right)\right), \quad \text{[Equation 10]}$$

$$x \in \bigcup_{i=-(K-1)}^{K-1} [i-\epsilon, i+\epsilon]$$

To approximate the piecewise continuous functions including the functions of Equations 9 and 10, the processor 100 may assume a general piecewise continuous function defined on a union of finitely many closed intervals, which is given as Equation 11.

$$D = \bigcup_{i=1}^{t} [a_i, b_i] \subset [a, b] \subset \mathbb{R} \quad \text{[Equation 11]}$$

Here, $a_i < b_i < a_{i+1} < b_{i+1}$ for all $i=1, \ldots, t-1$.

To approximate a given piecewise continuous function with a polynomial having a degree less than or equal to d on D of Equation 11, the processor 100 may set a criterion for selecting new d+2 reference points from among multiple extreme points.

The processor 100 may generate a target approximate polynomial by using $\{g_1, \ldots, g_n\}$ satisfying the Haar condition on [a, b] as the basis of polynomial. The processor 100 may obtain the minimax approximate polynomial in regard to the set of reference points for each iteration, and select a new set of reference points for next iteration.

There may be many cases where the processor 100 selects n+1 points from among extreme points of an error function evaluated using the arbitrary polynomial obtained using the set of reference points. The processor 100 may consider many intervals during the encryption process, and thus there may be lots of candidate extreme points.

The processor 100 may select n+1 target points from among many candidate points for each iteration to minimize the number of iterations. Through this, the processor 100 may generate the minimax approximate polynomial by converging the approximate polynomial generated for each iteration.

In order to set the criterion for selecting n+1 target points, the processor 100 may define the function of Equation 12.

$$\mu_{p,f}(x) = \begin{cases} 1 & p(x) - f(x) \text{ is a local maximum value at } x \text{ on } D \\ -1 & p(x) - f(x) \text{ is a local minimum value at } x \text{ on } D \\ 0 & \text{otherwise,} \end{cases}$$ [Equation 12]

Here, p(x) denotes an arbitrary polynomial obtained in each iteration, and f(x) denotes a piecewise continuous function to be approximated. For convenience, $\mu_{p,f}$ may be hereinafter referred to as $\mu$.

The processor 100 may obtain all extreme points of p(x)−f(x) into a set B, B may be a finite set and expressed as B={$x_1, x_2, \ldots, x_m$}. The processor 100 may select a point in an interval in B.

Assuming that B is ordered in increasing order, $x_1 < x_2 < \ldots x_m$, then the values of $\mu$ may be 1 or −1. The number of extreme points may satisfy m≥n+1.

The processor 100 may define a set of functions $\mathcal{S}$ as expressed by Equation 13.

$$\mathcal{S} = \{\sigma:[n+1] \to [m] | \sigma(i) < \sigma(i+1) \text{ for all } i=1, \ldots, n\}$$ [Equation 13]

In this example, the set $\mathcal{S}$ may include only the identity function if n+1=m.

The processor 100 may set three criteria for selecting n+1 extreme points.

The processor 100 may set a local extreme value condition as the first condition. If E is the absolute error at the set reference points, the condition of Equation 14 may be set.

$$\min_i \mu(x_{\sigma(i)})(p(x_{\sigma(i)}) - f(x_{\sigma(i)})) \geq E$$ [Equation 14]

To satisfy the local extreme value condition, the processor 100 may remove the extreme points if the local maximum value of p(x)−f(x) is negative or the local minimum value of p(x)−f(x) is positive.

Secondly, the processor 100 may set an alternating condition. In other words, the condition of Equation 15 may be set. In detail, if one of two adjacent extreme points has a local maximum value, the other extreme point may have a local minimum value.

$$\mu(x_{\sigma(i)}) \cdot \mu(x_{\sigma(i+1)}) = -1 \text{ for } i=1, \ldots, n$$ [Equation 15]

Thirdly, the processor 100 may set a maximum absolute sum condition. The processor 100 may select σ maximizing the value of Equation 16 from among σ satisfying the local extreme value condition and the alternating condition.

$$\sum_{i=1}^{n+1} |p(x_{\sigma(i)}) - f(x_{\sigma(i)})|$$ [Equation 16]

The absolute error value at current reference points $x_1, \ldots, x_{n+1}$ may be less than the minimax approximation error, and converge to the minimax approximation error as the number of iterations increases.

Further, the absolute error value at the current reference points may be a weighted average of the absolute error values of the approximate polynomial in the previous iteration at $x_1, \ldots, x_{n+1}$.

The processor 100 may help for the absolute error value at the current reference points to converge to the minimax approximation error fast, using the maximum absolute sum condition.

The local extreme value condition and the alternating condition may be applied to both the algorithms of FIGS. 2A and 2B, and the maximum absolute sum condition may be applied to Algorithm 2 of FIG. 2B. The processor 100 may apply the maximum absolute sum condition, thereby expediting the convergence to the minimax approximate polynomial.

The set $\mathcal{S}$ always contains at least one element $\sigma_0$ that satisfies the local extreme value condition and the alternating condition, and may have $\sigma_0(i_0)$ satisfying $|p(x_{\sigma_0(i_0)}) - f(x_{\sigma_0(i_0)})| = \|p-f\|_\infty$ for some $i_0$.

The processor 100 may more efficiently perform steps 2, 3, and 4 of Algorithm 2 of FIG. 2B as follows. The processor 100 may find coefficients of the approximate polynomial with a power basis at the current reference points for the continuous function f(x).

That is, the processor 100 may generate a target approximate polynomial by obtaining the values of the coefficient $c_j$ in Equation 17.

$$\sum_{j=0}^{d} c_j x_i^j - f(x_i) = (-1)^i E$$ [Equation 17]

Here, E may be an unknown in a linear equation. As the degree of basis of an approximate polynomial increases, the coefficients may decrease. The processor 100 may need to set a higher precision for the coefficients of a higher degree basis.

Thus, the processor 100 may effectively solve the precision problem by using the basis of Chebyshev polynomials as the basis of the target approximate polynomial. Since the coefficients of a polynomial with the Chebyshev basis usually have almost the same order, the processor 110 may generate the target approximate polynomial using the Chebyshev basis instead of the power basis.

The Chebyshev polynomials satisfy the Haar condition described above, and the processor 100 may obtain the target approximate polynomial by calculating and $c_j$ by solving the system of d+2 linear equations of Equation 18 using d+2 reference points.

$$\sum_{j=0}^{d} c_j T_j(x_i) - f(x_i) = (-1)^i E$$ [Equation 18]

Figure 3:
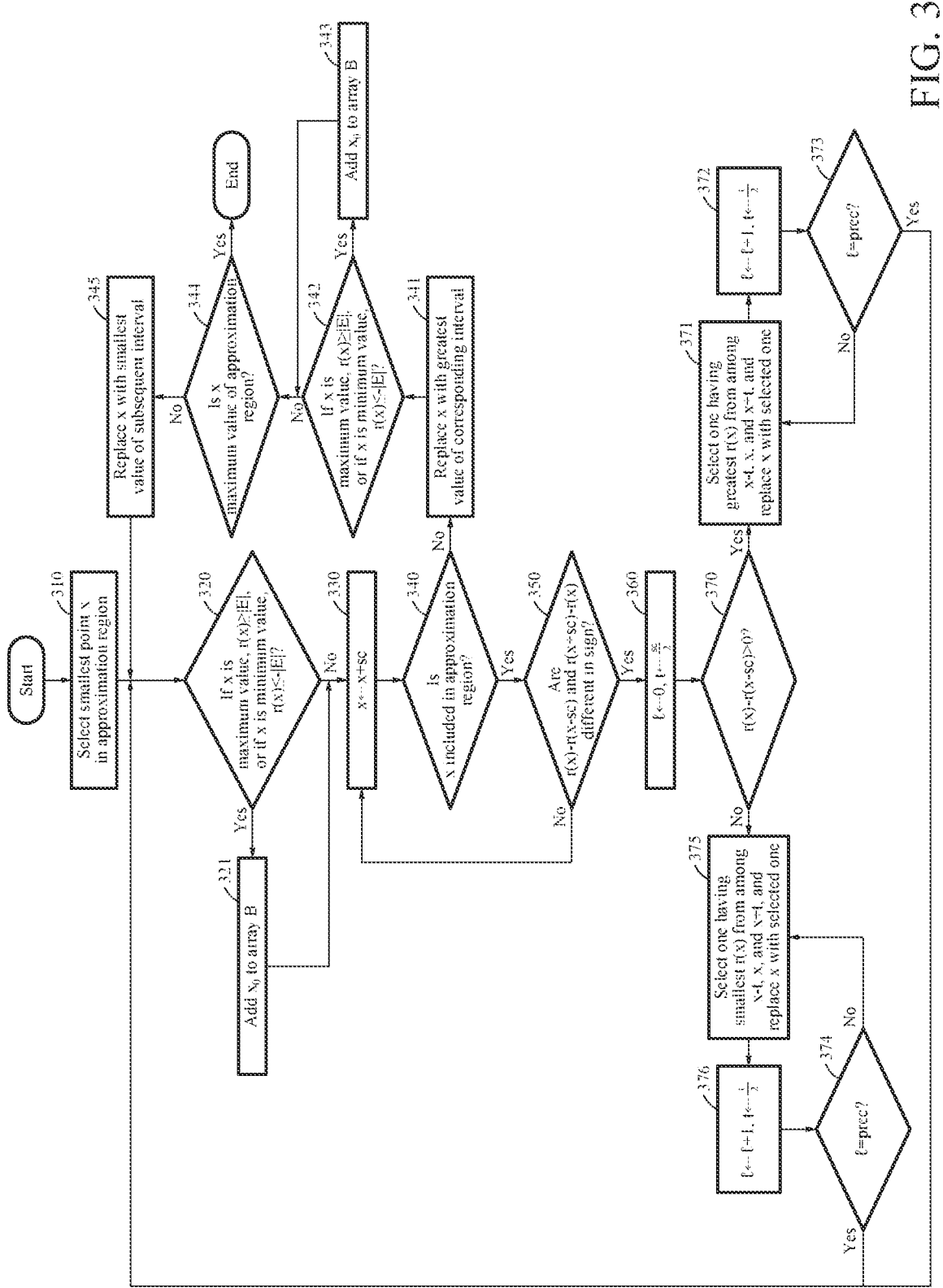
FIG. 3 illustrates an example of searching for extreme points by the encryption apparatus of FIG. 1.

FIG. 3 illustrates an example of searching for extreme points by the encryption apparatus of FIG. 1.

In FIG. 3, the processor 100 may obtain an arbitrary polynomial based on reference points, and search for extreme points of errors between the arbitrary polynomial and a piecewise continuous function that passes through the reference points. The processor 100 may obtain candidate points whose absolute values are greater than or equal to a predetermined value among the extreme points of errors between the arbitrary polynomial and the piecewise continuous function that passes through the reference points. Hereinafter, the process of obtaining candidate points by searching for extreme points by the processor 100 will be described.

The processor 100 may obtain extreme points where the increase and decrease are exchanged by scanning the errors p(x)−f(X) between the arbitrary polynomial and the piecewise continuous function with a small scan step.

In general, a small scan step may increase the precision of searching for the extreme points but cause a long scan time. To be more specific, it may take a time proportional to $2^\ell$ to obtain the extreme points with the $\ell$-bit precision.

However, the processor 100 may search for the extreme points within a linear time of $\ell$ instead of a time of $2^\ell$ through the search operation which will be described below.

The processor 100 may reduce the search time for the extreme points where the increase and the decrease are exchanged, using a binary search. Hereinafter, the errors between the arbitrary polynomial and the piecewise continuous function may be denoted as r(x)=p(x)−f(x), and sc denotes the scan step.

The processor 100 may search for $x_0$ satisfying $\mu(x_0)r(x_0) \geq |E|$ and $(r(x_0)-r(x_0-sc))(r(x_0+sc)-r(x_0)) \leq 0$, and obtain the i-th extreme points by performing the process of Equation 19 successively $\ell$ times.

$$x_{i,k} = \underset{x \in \{x_{i,k-1}-SC/2^k, x_{i,k-1}, x_{i,k-1}+SC/2^k\}}{\arg\max} |r(x)|, \quad \text{[Equation 19]}$$

$$k = 1, 2, \ldots, \ell.$$

Through the process of Equation 19, the processor 100 may obtain the extreme points with the precision of $O(\log(sc)+\ell)$ bits.

Hereinafter, the process of obtaining candidate points through the above extreme point search will be described in detail. In operation 310, the processor 100 may obtain the smallest point x in an approximation region. In operation 320, the processor 100 may determine whether r(x) is greater than or equal to the absolute value of E if x is a maximum value, and determine whether r(x) is less than or equal to a value obtained by multiplying the absolute value of E by −1 if x is a minimum value.

If the condition of operation 320 is satisfied, the processor 100 may add $x_0$ to an array B, in operation 321. If the condition of operation 320 is not satisfied, the processor 100 may replace x with x+sc, in operation 330.

Then, in operation 340, the processor 100 may determine whether x is included in the approximation region. If x is included in the approximation region, the processor 100 may determine whether r(x)−r(x−sc) and r(x+sc)−r(x) are different in sign, in operation 350.

If x is not included in the approximation region, the processor 100 may replace x with the greatest value in a corresponding interval, in operation 341. In this case, in operation 342, the processor 100 may determine whether r(x) is greater than or equal to the absolute value of E if x is a maximum value, and determine whether r(x) is less than or equal to a value obtained by multiplying the absolute value of E by −1 if x is a minimum value.

If the condition of operation 342 is satisfied, the processor 100 may add $x_0$ to the array B, in operation 343. If the condition of operation 342 is not satisfied, the processor 100 may determine whether x is the maximum value in the approximation region, in operation 344. In this example, if x is the maximum value in the approximation region, the processor 100 may terminate the operation. If x is not the maximum value in the approximation region, the processor 100 may replace x with the smallest value in a subsequent interval, in operation 345.

If r(x)−r(x−sc) and r(x+sc)−r(x) have the same sign, the processor 100 may perform operation 330 again. If r(x)−r(x−sc) and r(x+sc)−r(x) are different in sign, the processor 100 may replace $\ell$ with 0 and t with sc/2, in operation 360.

In operation 370, the processor 100 may determine whether the value of r(x)−r(x−sc) is greater than 0. If the condition of operation 370 is satisfied, the processor 100 may select one having the greatest value of r(x) from among x−t, x, and x+t, and replace x with the selected one, in operation 371. Then, in operation 372, the processor 100 may replace $\ell$ with $\ell$+1 and t with t/2.

In operations 373 and 374, the processor 100 may determine whether $\ell$ is a precision value. If $\ell$ is not the precision value, the processor 100 may perform operation 371 again. If the condition of operation 370 is not satisfied or $\ell$ is not the precision value in operation 374, the processor 100 may select one having the smallest value of r(x) from among x−t, x, and x+t, and replace x with the selected one, in operation 375. Then, in operation 376, the processor 100 may replace $\ell$ with $\ell$+1 and t with t/2.

If the conditions of operations 373 and 374 are satisfied, the processor 100 may perform operation 320 again. Finally, the processor 100 may obtain extreme points in the array B as candidate points.

If the value of sc is sufficiently small, |r(x)| may be a>0 and operate similar to $a(x-x^*)^2+b$ for b near $x^*$. Through such operations, the processor 100 may guarantee $|r(x_1)|<|r(x_2)|$ and the reverse thereof if $|x_1-x^*|<|x_2-x^*|$ near $x^*$.

Through the operation of obtaining candidate points through the extreme point search described above, the processor 100 may obtain candidate points by searching for the extreme points with the $\ell$-bit precision within a linear time of $\ell$ instead of $2^\ell$.

Figure 4B:
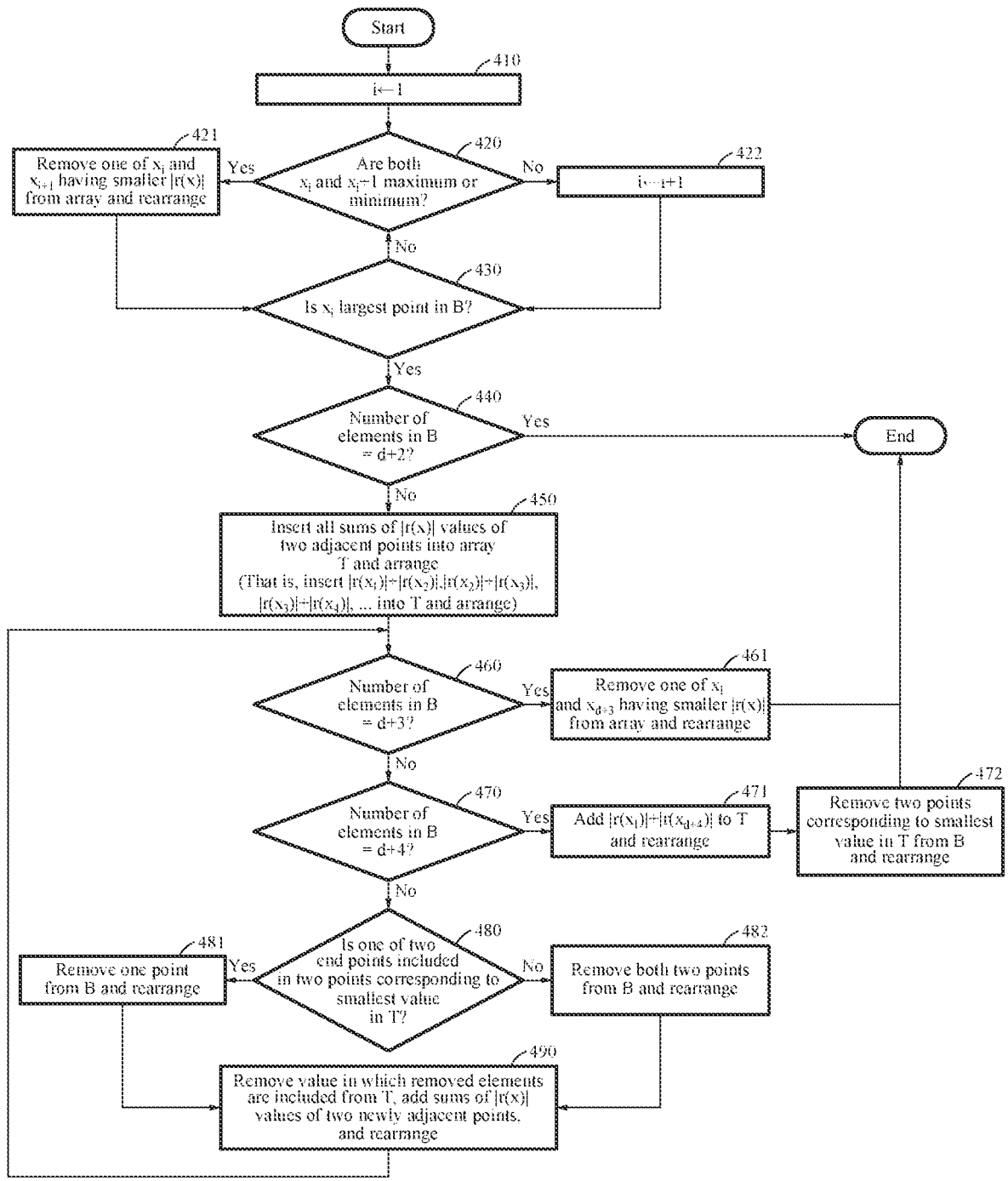
FIG. 4B illustrates an example of selecting target points by the encryption apparatus of FIG. 1

FIG. 4A illustrates an example of an algorithm for selecting target points by the encryption apparatus of FIG. 1, and FIG. 4B illustrates an example of selecting target points by the encryption apparatus of FIG. 1.

In FIGS. FIGS. 4A and 4B, the processor 100 may select target points from among candidate points obtained through the search operation of FIG. 3, where the number of target points is based on the degree of a target approximate polynomial.

The processor 100 may select the target points from among the candidate points such that a maximum and a minimum appear in alternation, and select the target points such that the sum of absolute values of errors is maximized. The target points may be new reference points in a subsequent iteration operation.

Hereinafter, the process of obtaining target points will be described in detail. The processor 100 may select points satisfying the local extreme value condition, the alternating condition, and maximum absolute sum condition in a naive approach to find target points (or new reference points).

The naive approach is to select n+1 points having the maximum absolute sum by calculating absolute sums for all n+1 points satisfying the alternating condition. If there are m local extreme points, the naive approach may need to investigate all $$\binom{m}{n+1}$$

points.

Compared to the naive approach, the processor 100 may reduce the time for selecting target points through the operations of FIGS. 4A and 4B. Hereinafter, the operation of effectively selecting target points will be described.

The processor 100 may finally obtain n+1 target points by eliminating some elements from candidate points for each iteration. If m>n+1, at least one element may not be included in the target points.

Through the algorithm of FIG. 4A, the processor 100 may select target points within a time $O$ (m log m). In other words, the processor 100 may select the target points within a quasi-linear time.

Whenever an element in the ordered set B is removed, the remaining elements may be arranged, and indices may be relabeled in increasing order.

When comparing the values to remove some extreme points in Algorithm 3 of FIG. 4A, the compared values may be equal, or the smallest element may be more than one. In that case, the processor 100 may randomly remove these elements.

The flowchart of FIG. 4B shows the sequence of operations in the algorithm of FIG. 4A. Through the operations of FIGS. 4A and 4B, the processor 100 may obtain an array B having target points as elements.

In operation 410, the processor 100 may replace i with 1. In operation 420, the processor 100 may determine whether both $x_i$ and $x_{i+x}$ are maximum or minimum.

If the condition of operation 420 is satisfied, the processor 100 may remove one of $x_i$ and $x_{i+1}$ having smaller $|r(x)|$ from the array, and rearrange the remaining elements in the array, in operation 421. The value of $|r(x)|$ may be the value of an error between the arbitrary polynomial and the piecewise continuous function described above. If the condition of operation 420 is not satisfied, the processor 100 may replace i with i+1, in operation 422.

After the rearrangement, the processor 100 may determine whether $x_i$ is the largest point in the array B, in operation 430. If $x_i$ is not the largest point, the processor 100 may perform operation 420 again.

Operations 410 to 430 may correspond to the operations in steps 1 to 7 of Algorithm 3 of FIG. 4A.

If $x_i$ is the largest point, the processor 100 may determine whether the number of elements in B is d+2, in operation 440. If the number of elements in B is d+2, the processor 100 may terminate the operation of selecting target points.

If the number of elements in B is not d+2, the processor 100 may insert the sum of $|r(x)|$ values of every two adjacent points into an array T and arrange the array T, in operation 450. That is, $|r(x_1)|+|r(x_2)|$, $|r(x_2)|+|r(x_3)|$, $|r(x_3)|+|r(x_4)|$, ... may be inserted into T, and T may be arranged.

Operations 440 and 450 may correspond to the operations in steps 9 and 10 of Algorithm 3 of FIG. 4A.

In operation 460, the processor 100 may determine whether the number of elements in B is d+3. If the number of elements in B is d+3, the processor 100 may remove one of $x_1$ and $x_{d+3}$ having smaller $|r(x)|$ from the array, rearrange the array, and terminate the operation, in operation 461.

In operation 470, the processor 100 may determine whether the number of elements in B is d+4. If the number of elements in B is d+4, the processor 100 may add $|r_{x_1}|+|r_{x_{d+4}}|$ to T and rearrange T, in operation 471. After that, in operation 472, the processor 100 may remove two points corresponding to the smallest value in T from B, rearrange B, and terminate the operation.

If the number of elements in B is not d+4, the processor 100 may determine whether one of the two end points is included in the two points corresponding to the smallest value in T, in operation 480. If the condition of operation 480 is satisfied, the processor 100 may remove one of the two end points from B, and rearrange B, in operation 481. If the condition of operation 480 is not satisfied, the processor 100 may remove both two points corresponding to the smallest value in T from B, and rearrange B, in operation 482.

After that, the processor 100 may remove the value in which the removed elements are included from T, add the sums of $|r(x)|$ values of two newly adjacent points to T, and rearrange T in operation 490, and perform operation 460 again. Operations 460 to 490 may correspond to the operations in steps 11 to 23 of Algorithm 3 of FIG. 4A.

Describing an example of removing an extreme point $x_2$ at the last part of the algorithm of FIG. 4A, T={$|r(x_1)|+|r(x_2)|$, $|r(x_2)|+|r(x_3)|$, $|r(x_3)|+|r(x_4)|$, ... } may be changed to T={$|r(x_1)|+|r(x_3)|$, $|r(x_3)|+|r(x_4)|$, ... }.

Through the operation of selecting target points of FIGS. 4A and 4B, the processor 100 may select target points from among candidate points within a quasi-linear time.

The processor 100 may generate a target approximate polynomial that optimally approximates a modular reduction function based on the selected target points. In other words, the processor 100 may generate a polynomial of degree d that passes through the selected target points as the target approximate polynomial.

Figure 5:
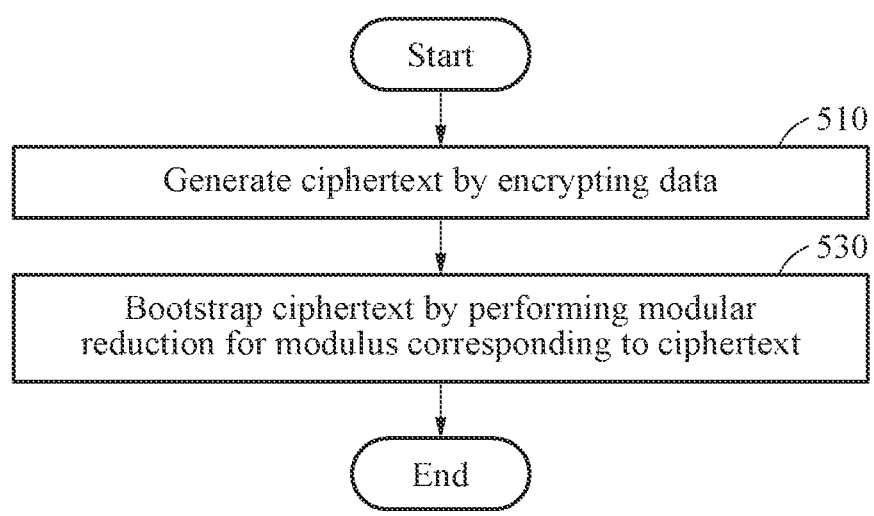
FIG. 5 illustrates an example of an overall operation of the encryption apparatus of FIG.

FIG. 5 illustrates an example of an overall operation of the encryption apparatus of FIG. 1.

The processor 100 may encrypt data using homomorphic encryption. In operation 510, the processor 100 may generate a ciphertext by encrypting data.

In operation 530, the processor 100 may bootstrap the ciphertext by performing a modular reduction based on a selection of one or more target points for a modulus corresponding to the generated ciphertext.

The processor 100 may bootstrap the ciphertext by approximating a function corresponding to the modular reduction. The processor 100 may generate a target approximate polynomial that approximates the function corresponding to the modular reduction.

The processor 100 may determine one or more reference points based on a degree of the target approximate polynomial. The processor 100 may obtain an arbitrary polynomial based on the determined one or more reference points.

In detail, the processor 100 may obtain a piecewise continuous function that passes through the one or more reference points, and obtain the arbitrary polynomial, by generating a polynomial such that absolute values of errors between the polynomial and the piecewise continuous function at the one or more reference points are a predetermined value.

The processor 100 may obtain the arbitrary polynomial, by generating a polynomial such that an error at a first reference point included in the one or more reference points and an error at a second reference point adjacent to the first reference point are different in sign, and absolute values of the errors are the predetermined value.

The processor 100 may generate the target approximate polynomial based on one or more extreme points selected from the obtained arbitrary polynomial. The processor 100 may obtain candidate points whose absolute values are greater than or equal to a predetermined value among extreme points of errors between the arbitrary polynomial and the piecewise continuous function that passes through the one or more reference points.

The processor 100 may select target points from among the obtained candidate points, where the number of target points is based on the degree of the target approximate polynomial. In detail, the processor 100 may select the target points from among the candidate points such that a maximum and a minimum appear in alternation. The processor 100 may select the target points such that the sum of the absolute values of the errors between the arbitrary polynomial and the piecewise continuous function is maximized.

The processor 100 may generate the target approximate polynomial based on the selected target points. The processor 100 may generate, as the target approximate polynomial, a polynomial for a case where a relative error between a maximum value and a minimum value among the absolute values of the one or more extreme points is less than a threshold.

In this example, a basis of the target approximate polynomial may be the basis of the Chebyshev polynomials.

As a non-exhaustive example only, a terminal as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

The encryption apparatus 10, processor 100, and memory 200 in FIGS. 1-5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented encryption method using homomorphic encryption, the encryption method comprising:
    encrypting plain text data into a first ciphertext;
    performing a first homomorphic operation on the first ciphertext to generate a second ciphertext, the second ciphertext comprises a coefficient that is higher than coefficient of the first ciphertext due to noise introduced during the first homomorphic operation;
    generating a target polynomial based on the increased coefficient, the target polynomial corresponds to a modular reduction, comprising:
        iteratively determining one or more reference points based on a predetermined degree of the target polynomial;
        determining a predetermined polynomial that passes through the one or more reference points where absolute values of error between the predetermined polynomial and a determined piecewise continuous function at the one or more reference points alternate in sign;
        selecting one or more target points from the predetermined polynomial and the determined piecewise continuous function such that the one or more target points alternate in sign; and
        generating the target polynomial based on absolute values of error of the one or more target points being within a predefined range corresponding to the increased coefficient; and
    generating a third ciphertext based on the target polynomial where the target polynomial reduces the increased coefficient within the predefined range to enable additional homomorphic operation, by performing a second homomorphic operation on the second ciphertext.

2. The encryption method of claim 1, further comprising performing the determining of the predetermined polynomial, comprising:
    generating the predetermined polynomial such that absolute values of errors, between the predetermined polynomial and the determined piecewise continuous function that passes through the one or more reference points, are a predetermined value.

3. The encryption method of claim 2, further comprising generating of the predetermined polynomial includes generating the predetermined polynomial such that an error at a first reference point included in the one or more reference points and an error at a second reference point adjacent to the first reference point are different in sign, and absolute values of the error at the first reference point and the error at the second reference point are the predetermined value.

4. The encryption method of claim 1, further comprising performing the selecting of the one or more target points, including selecting target points from among a total candidate points whose absolute values are greater than or equal to a predetermined value among determined error points between the predetermined polynomial and the piecewise continuous function that passes through the one or more reference points, where a total number of the selected target points is based on the degree of the target polynomial.

5. The encryption method of claim 4, further comprising determining the candidate points to have the absolute values be greater than or equal to the predetermined value among the determined error points, wherein the selecting of the target points comprises selecting the target points, from among the candidate points, such that, a maximum error value and a minimum error value appear in alternation.

6. The encryption method of claim 4, wherein the selecting of the target points comprises selecting the target points such that a sum of the absolute values of the errors is maximized.

7. The encryption method of claim 1, wherein the generating of the target polynomial comprises generating the target polynomial having a relative error, between a maximum value and a minimum value among the absolute values of the one or more determined error points, less than a threshold.

8. The encryption method of claim 1, further comprising a basis of the target polynomial being a basis of Chebyshev polynomials.

9. A non-transitory computer-readable storage medium storing instructions that, when executed by one or more processors, configure the one or more processors to perform the method of claim 1.

10. The encryption method of claim 1, for the one or more reference points, wherein the target polynomial corresponds to the modular reduction and the predetermined polynomial satisfies the equation $$p(x_i)-f(x_i)=(-1)^i E \; i=1, \ldots, d+2,$$

where f (x) is a function corresponding to the modular reduction, p(x) is the predetermined polynomial, and E is a predetermined value.

11. An encryption apparatus using homomorphic encryption, the encryption apparatus comprising:
one or more processors configured to:
encrypt plain text data into a first ciphertext;
perform a first homomorphic operation on the first ciphertext to generate a second ciphertext, the second ciphertext comprises a coefficient that is higher than coefficient of the first ciphertext due to noise introduced during the first homomorphic operation;
generate a target polynomial based on the increased coefficient, the target polynomial corresponds to a modular reduction, the generation of the target polynomial comprising:
an iterative determination of one or more reference points based on a predetermined degree of the target polynomial;
a determination of a predetermined polynomial that passes through the one or more reference points where absolute values of error between the predetermined polynomial and a determined piecewise continuous function at the one or more reference points alternate in sign;
a selection of one or more target points from the predetermined polynomial and the determined piecewise continuous function such that the one or more target points alternate in sign; and
a generation of the target polynomial based on absolute values of error of the one or more target points being within a predefined range corresponding to the increased coefficient; and
generate a third ciphertext based on the target polynomial where the target polynomial reduces the increased coefficient within the predefined range to enable additional homomorphic operation, by performing a second homomorphic operation on the second ciphertext.

12. The encryption apparatus of claim 11, wherein, for the generation of the target polynomial, the one or more processors are further configured to generate the target polynomial that is determined a most accurate representation of the modular reduction.

13. The encryption apparatus of claim 11, wherein the one or more processors are further configured to:
generate the predetermined polynomial such that absolute values of errors, between the predetermined polynomial and a determined piecewise continuous function that passes through the one or more reference points, are a predetermined value.

14. The encryption apparatus of claim 13,
wherein the one or more processors are further configured to determine the one or more reference points based on the degree of the target polynomial, and
wherein, for the generation of the predetermined polynomial, the one or more processors are configured to generate the predetermined polynomial such that an error at a first reference point included in the one or more reference points and an error at a second reference point adjacent to the first reference point are different in sign, and absolute values of the error at the first reference point and the error at the second reference point are the predetermined value.

15. The encryption apparatus of claim 11,
wherein the one or more processors are further configured to perform the selection of the one or more target points, including a selection of target points from among a total candidate points whose absolute values are greater than or equal to a predetermined value among determined error points between the predetermined polynomial and the piecewise continuous function that passes through the one or more reference points, where a total number of selected target points is based on the degree of the target polynomial.

16. The encryption apparatus of claim 15,
wherein the one or more processors are further configured to determine the candidate points to have the absolute values be greater than or equal to the predetermined value among the determined error points, and
wherein, for the performance of the selection, the one or more processors are configured to select the target points from among the candidate points such that a maximum error value and a minimum error value appear in alternation.

17. The encryption apparatus of claim 15, wherein, for the performance of the selection, the one or more processors are further configured to select the target points such that a sum of the absolute values of the errors is maximized.

18. The encryption apparatus of claim 11, wherein, for the generation of the target polynomial, the one or more processors are further configured to generate the target polynomial having a relative error, between a maximum value and a minimum value among the absolute values of the one or more determined error points, less than a threshold.

19. The encryption apparatus of claim 12, wherein a basis of the target polynomial is a basis of Chebyshev polynomials.

20. An apparatus configured to perform a homomorphic encryption scheme, comprising:
one or more processors configured to:
encrypt plain text data into a first ciphertext;
perform a first homomorphic operation on the first ciphertext to generate a second ciphertext, the second ciphertext comprises a coefficient that is higher than coefficient of the first ciphertext due to noise introduced during the first homomorphic operation;
generate a target polynomial based on the increased coefficient, the target polynomial corresponds to a modular reduction, the generation of the target polynomial comprising:
an iterative determination of one or more reference points based on a predetermined degree of the target polynomial;
a determination of a predetermined polynomial that passes through the one or more reference points where absolute values of error between the predetermined polynomial and a determined piecewise continuous function at the one or more reference points alternate in sign and have equal absolute values;
a determination of candidate points having absolute values that are greater than or equal to the predetermined value among extreme points between the predetermined polynomial and the piecewise continuous function that passes through the one or more reference points;
a determination of one or more target points from among the candidate points such that a maximum error value and a minimum error value alternates, or a sum of absolute values of the extreme points is maximized within a predefined range corresponding to the increased coefficient; and
    a generation of the target polynomial based on the one or more target points; and
generate a third ciphertext based on the target polynomial where the target polynomial reduces the increased coefficient within the predefined range to enable additional homomorphic operation, by performing a second homomorphic operation on the second ciphertex.

21. The apparatus of claim 20, wherein the target polynomial is generated using Chebyshev alternation theorem.

* * * * *